(12) United States Patent
Tanaka et al.

(10) Patent No.: US 11,505,097 B2
(45) Date of Patent: Nov. 22, 2022

(54) OCCUPANT PROTECTION DEVICE FOR VEHICLE

(71) Applicant: TOYODA GOSEI CO., LTD., Kiyosu (JP)

(72) Inventors: Koki Tanaka, Kiyosu (JP); Takashi Iida, Kiyosu (JP); Shigeyuki Suzuki, Kiyosu (JP); Tadashi Yamada, Kiyosu (JP); Shigemi Mase, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 579 days.

(21) Appl. No.: 16/589,556

(22) Filed: Oct. 1, 2019

(65) Prior Publication Data
US 2020/0122610 A1 Apr. 23, 2020

(30) Foreign Application Priority Data
Oct. 19, 2018 (JP) .............................. JP2018-197271

(51) Int. Cl.
*B60N 2/42* (2006.01)
*B60R 21/207* (2006.01)
*B60N 2/64* (2006.01)
*B60R 21/26* (2011.01)
(Continued)

(52) U.S. Cl.
CPC ......... *B60N 2/4221* (2013.01); *B60N 2/4279* (2013.01); *B60R 21/207* (2013.01); *B60N 2/64* (2013.01); *B60R 21/239* (2013.01); *B60R 21/26* (2013.01)

(58) Field of Classification Search
None
See application file for complete search history.

(56) References Cited

U.S. PATENT DOCUMENTS 7,549,674 B2 * 6/2009 Yoshikawa ........ B60N 2/42718
280/740
7,789,417 B2 * 9/2010 Yoshikawa ........ B60N 2/42763
280/730.1
(Continued)

FOREIGN PATENT DOCUMENTS

DE    10065464 A1 *  8/2001  ........... B60N 2/4221
JP  2006069520 A  *  3/2006  ........... B60R 21/201
(Continued)

OTHER PUBLICATIONS

Office Action dated Dec. 7, 2021 issued in corresponding JP Application No. 2018-197271 (and English translation).

*Primary Examiner* — Faye M Fleming
(74) *Attorney, Agent, or Firm* — Posz Law Group, PLC

(57) ABSTRACT

An occupant protection device, for a vehicle which protects an occupant seated on a seating surface of a seat, includes: a first push-up mechanism which pushes up a waist portion of the occupant by raising a rear portion of the seating surface; a second push-up mechanism which pushes up a thigh portion of the occupant by raising a front portion of the seating surface; and a control unit which controls operations of the first push-up mechanism and the second push-up mechanism. The control unit operates the first push-up mechanism and then operates the second push-up mechanism when an impact applied to the vehicle from the front of the seat is detected or predicted.

8 Claims, 4 Drawing Sheets

(51) Int. Cl.
*B60R 21/239* (2006.01)
*B60N 2/427* (2006.01)

(56) References Cited

U.S. PATENT DOCUMENTS

| | | | | |
|---|---|---|---|---|
| 8,702,121 | B2 * | 4/2014 | Yamashita | B60R 21/207 |
| | | | | 297/216.1 |
| 8,888,126 | B2 * | 11/2014 | Nukaya | B60N 2/42763 |
| | | | | 280/743.2 |
| 9,114,743 | B2 * | 8/2015 | Komamura | B60N 2/4221 |
| 2006/0119149 | A1 * | 6/2006 | Yoshikawa | B60N 2/42718 |
| | | | | 280/753 |
| 2013/0082457 | A1 | 4/2013 | Hashido et al. | |
| 2019/0106029 | A1 * | 4/2019 | Komura | B60N 2/0276 |

FOREIGN PATENT DOCUMENTS

| | | |
|---|---|---|
| JP | 2006-159980 A | 6/2006 |
| JP | 2007-038926 A | 2/2007 |
| JP | 2008-162546 A | 7/2008 |
| JP | 2008-195202 A | 8/2008 |
| JP | 2009-154746 A | 7/2009 |
| JP | 2009-190459 A | 8/2009 |
| JP | 2010-052622 A | 3/2010 |
| JP | 5545282 B2 | 7/2014 |

* cited by examiner

OCCUPANT PROTECTION DEVICE FOR VEHICLE

CROSS-REFERENCE TO RELATED APPLICATION(S)

This application is based upon and claims the benefit of priority from prior Japanese patent application No. 2018-197271 filed on Oct. 19, 2018, the entire contents of which are incorporated herein by reference.

BACKGROUND

1. Field of the Invention

The present invention relates to an occupant protection device which protects an occupant by restricting a forward movement of a waist portion of the occupant when an impact is applied to a vehicle from the front of a seat.

2. Description of the Related Art

In vehicles such as automobiles, when an impact is applied to the vehicle from the front due to a frontal collision, an occupant tries to move forward due to inertia. In this case, the occupant is retained on a seat cushion by a holding action of a seat belt device. However, depending on the posture of the occupant, a phenomenon in which a waist portion of the occupant moves forward away from a lap belt portion of the seat belt device, that is, a so-called submarine phenomenon becomes a problem. Therefore, a seat cushion airbag device for restricting the phenomenon has been developed (see Japanese Patent No. 5545282, for example).

The seat cushion airbag device (hereinafter referred to as an airbag device) includes an airbag and a gas generator. A seat cushion includes a cushion portion having a seating surface and a support member which supports the cushion portion from below and the airbag is disposed between the cushion portion and the support member. The gas generator is accommodated in a front end portion of the airbag and fastened to the support member.

According to such an airbag device, when an impact from the front is detected, gas is ejected from the gas generator to inflate the airbag and the cushion portion is pushed up by the airbag to raise the seating surface. In this case, a thigh portion of an occupant restrained in the seat by the seat belt device is pushed upward and a waist portion is pressed against a lap belt portion. As a result, the performance of the lap belt portion to restrain the waist portion is enhanced and a forward movement of the waist portion is restricted.

Development of automatic driving technology for automobiles is in progress. During automatic driving, the occupant's seating posture is expected to be different from that during manual driving. Specifically, during automatic driving, driving operations will be performed automatically on behalf of a driver. Therefore, it is expected that occupants including the driver take a relaxed posture, that is, a so-called comfortable posture, by tilting a seat back to a greater extent than in manual driving.

However, the seat cushion airbag device of the related art is designed on the assumption that an occupant is seated on a seat in a posture suitable for manual driving. Therefore, when the occupant is seated in the seat in a comfortable posture as described above, if an impact is applied to a vehicle from the front, a forward movement of a waist portion of the occupant may not be restricted.

SUMMARY

An object of the invention is to provide an occupant protection device for a vehicle capable of restricting a forward movement of a waist portion of an occupant who is in a comfortable posture.

According to a first aspect of the invention, there is provided an occupant protection device for a vehicle which protects an occupant seated on a seating surface of a seat, the occupant protection device including: a first push-up mechanism which pushes up a waist portion of the occupant by raising a rear portion of the seating surface; a second push-up mechanism which pushes up a thigh portion of the occupant by raising a front portion of the seating surface; and a control unit which controls operations of the first push-up mechanism and the second push-up mechanism, wherein the control unit operates the first push-up mechanism and then operates the second push-up mechanism when an impact applied to the vehicle from the front of the seat is detected or predicted.

According to the configuration, when an impact applied to the vehicle from the front of the seat is detected or predicted, first, the first push-up mechanism is operated by the control unit to raise the rear portion of the seating surface and push up the waist portion of the occupant. Therefore, since the occupant takes a comfortable posture, that is, leans back on the seat back, which is tilted backwards compared to a case of manual driving, the waist portion is pressed against the lap belt portion in a state where the lap belt portion of the seat belt device is not properly applied to the waist portion. This enhances the restraining performance of the waist portion by the lap belt portion. After that, the second push-up mechanism is operated by the control unit, so that the front portion of the seating surface is raised and the thigh portion of the occupant is pushed up. This restricts the forward movement of the waist portion of the occupant. Therefore, it is possible to restrict the forward movement of the waist portion of the occupant taking a comfortable posture.

According to a second aspect of the invention, in the first aspect, a seat cushion of the seat may include a cushion portion having the seating surface and a support member which supports the cushion portion from below, and the first push-up mechanism may include an airbag which is provided between the cushion portion and the support member, inflated by the supply of gas, and pushes up the cushion portion to raise a rear portion of the seating surface.

According to the configuration, by supplying gas to the airbag provided between the cushion portion and the support member, the airbag is inflated to push up the cushion portion, so that the rear portion of the seating surface is raised. Therefore, the waist portion of the occupant can be pushed up quickly.

According to a third aspect of the invention, in the second aspect, the airbag may have a vent hole.

When the rising state of the rear portion of the seating surface is maintained by the airbag, the effect of pushing up the thigh portion of the occupant by raising the front portion of the seating surface by the second push-up mechanism is reduced. As a result, the forward movement of the waist portion of the occupant may not be effectively restricted.

In this regard, according to the configuration described above, since the gas in the airbag is discharged through the vent hole, the rear portion of the seating surface is quickly sunk after being raised by the airbag. As a result, the effect of pushing up the thigh portion of the occupant by raising the front portion of the seating surface by the second push-up mechanism is easily exhibited, and consequently, the forward movement of the waist portion of the occupant can be effectively restricted.

According to a fourth aspect of the invention, in any one of the first to third aspects, a seat cushion of the seat may include a cushion portion having the seating surface and a support member which supports the cushion portion from below, the second push-up mechanism may include: an arm portion provided to be tiltable about an axis extending along a width direction of the seat; a connecting portion which is provided between the cushion portion and the support member, extends along the width direction of the seat, and is connected to a tip end portion of the arm portion; a push-up member provided so as to be displaceable between an accommodation position and a standing position which is above the accommodation position and at which the front portion of the seating surface is raised; and a drive unit for displacing the push-up member from the accommodation position to the standing position, and the control unit may control an operation of the drive unit.

According to the configuration, by operating the drive unit with the control unit, the push-up member is displaced from the accommodation position to the standing position. In this case, the connecting portion provided between the cushion portion and the support member pushes up the cushion portion, so that the front portion of the seating surface is raised. Here, since the connecting portion extends along the width direction of the seat, the pushing-up force can be effectively applied to the thigh portion of the occupant.

According to a fifth aspect of the invention, in the fourth aspect, the drive unit may include an airbag which is provided between the cushion portion and the support member and presses the connecting portion toward the standing position by being inflated by the supply of gas, and the airbag may pinch the connecting portion from the front and rear in a deployed state.

According to the configuration, by supplying gas to the airbag provided between the cushion portion and the support member, the airbag is inflated and presses the connecting portion, whereby the connecting portion and the arm portion are displaced from the accommodation position to the standing position.

According to a sixth aspect of the invention, in the fourth aspect, the drive unit may be a direct-acting-type actuator which presses and tilts the push-up member.

Here, since the connecting portion is pinched from the front and rear by the airbag in the deployed state, it is possible to restrict a strong impact force from acting on the thigh portion and the waist portion of the occupant.

According to the configuration, the push-up member can be displaced from the accommodation position to the standing position by pressing and tilting the push-up member with the direct-acting-type actuator. In this way, the push-up member is directly driven by the direct-acting-type actuator, so that the operating speed of the second push-up mechanism can be increased.

According to a seventh aspect of the invention, in any one of the first to third aspects, a seat cushion of the seat may include a cushion portion having the seating surface and a support member which supports the cushion portion from below and the second push-up mechanism may include an airbag which is provided between the cushion portion and the support member, inflated by the supply of gas, and pushes up the cushion portion to raise a front portion of the seating surface.

According to the configuration, by supplying gas to the airbag provided between the cushion portion and the support member, the airbag is inflated to push up the cushion portion, so that the front portion of the seating surface is raised. Therefore, the thigh portion of the occupant can be pushed up quickly.

According to an eighth aspect of the invention, in any one of the first to seventh aspects, the control unit may operate the first push-up mechanism only when the occupant is in a comfortable posture, and then operates the second push-up mechanism.

According to the configuration, the first push-up mechanism and the second push-up mechanism are operated in order only when the occupant is in a comfortable posture. Therefore, when the occupant is not in a comfortable posture, it is possible to avoid the occurrence of the inconvenience caused by the occupant's waist portion being pushed up first.

According to a ninth aspect of the invention, in the eighth aspect, the occupant protection device may further includes a detector which detects an inclination angle of a seat back of the seat with respect to a vertical direction of the vehicle, and the control unit may operate the first push-up mechanism, and then operate the second push-up mechanism based on an assumption that a seating posture of the occupant is a comfortable posture when the rearward inclination angle of the seat back with respect to the vertical direction is equal to or greater than a predetermined angle.

According to the configuration, the occupant's seating posture can be easily grasped based on the rearward inclination angle of the seat back with respect to the vertical direction.

It is possible to restrict a forward movement of a waist portion of an occupant who is in a comfortable posture.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Hereinafter, an embodiment will be described with reference to FIGS. 1 to 5.

Figure 2:
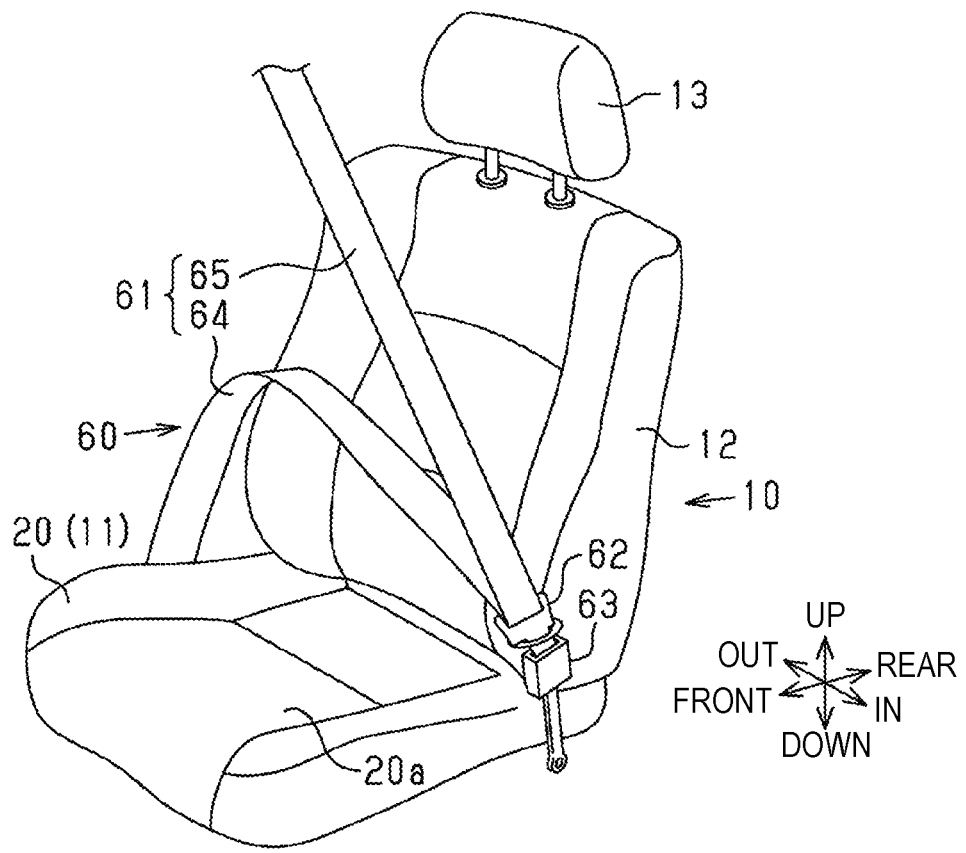
FIG. 2 is a perspective view illustrating a seat and a seat belt device in the embodiment.

In the following description, a forward direction of a vehicle is described as forward and front, rear, up, down, left, and right are defined based on the forward direction. In FIG. 2, "in" indicates the inside of the vehicle and "out" indicates the outside of the vehicle. The inside of the vehicle is a side approaching a center position in a width direction (vehicle width direction) of the vehicle and the outside of the vehicle is a side away from the center position. In addition, it is assumed that an occupant having the same physique as a collision test dummy is seated on a vehicle seat.

Figure 1:
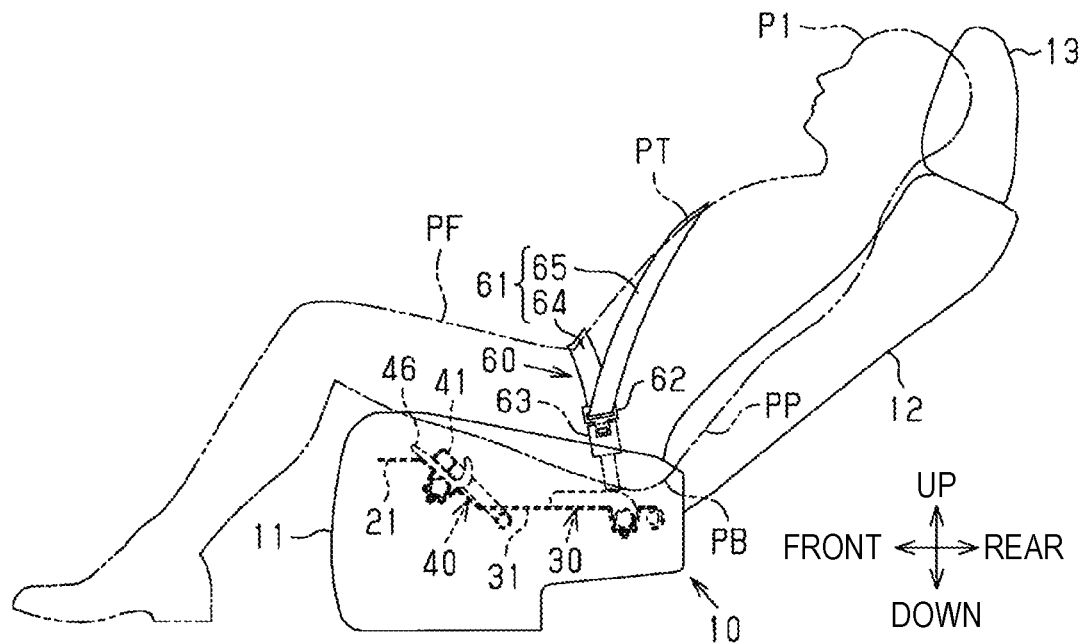
FIG. 1 is a side view illustrating a vehicle seat to which an occupant protection device is applied, together with an occupant and a seat belt device, according to an embodiment of the occupant protection device for a vehicle.

As illustrated in FIGS. 1 and 2, a vehicle seat 10 includes a seat cushion 11, a seat back 12 which is erected from a rear portion of the seat cushion 11 and disposed so as to be adjustable in an inclination angle with respect to a vertical direction, and a headrest 13 which is disposed above the seat back 12. The seat 10 is installed in the vehicle in a posture in which the seat back 12 faces the front of the vehicle. A front-rear direction of the seat 10 installed in this way matches a front-rear direction of the vehicle and the width direction of the seat 10 matches the vehicle width direction.

Figure 3:
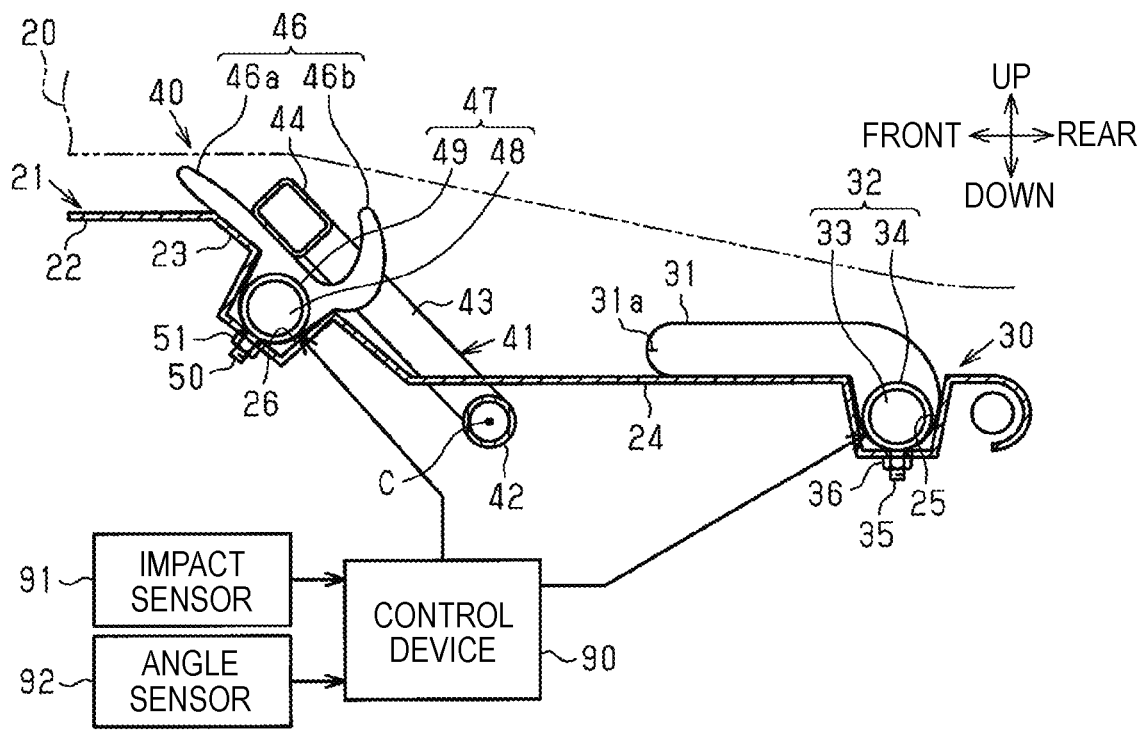
FIG. 3 is a side cross-sectional view illustrating a main part of the occupant protection device in the embodiment.

As illustrated in FIGS. 2 and 3, the seat cushion 11 includes a cushion portion 20 having a seating surface 20a on which an occupant P1 sits and a seat pan 21 made of a steel plate as a support member which supports the cushion portion 20 from below.

As illustrated in FIGS. 1 and 2, the vehicle is equipped with a seat belt device 60 for restraining the occupant P1 seated on the seat 10.

The seat belt device 60 includes a webbing 61 which has a belt shape and restrains the occupant P1, a tongue 62 movably attached to the webbing 61 in a length direction thereof, and a buckle 63 which is located on the inside of the vehicle further than the seat cushion 11 and on which the tongue 62 is detachably mounted. One end portion of the webbing 61 is fixed to the vehicle outer side of the seat cushion 11 and the other end portion is wound by a belt winding device (not illustrated) disposed on the vehicle outer side. In the seat belt device 60, the lengths of a lap belt portion 64 and a shoulder belt portion 65 can be adjusted by sliding the tongue 62 along the webbing 61.

In the webbing 61, the lap belt portion 64 is a portion extending from the tongue 62 to a fixed end of the webbing 61 and is stretched from one lateral side of a waist portion PP of the seated occupant P1 to the other lateral side via the front of the waist portion PP.

In the webbing 61, the shoulder belt portion 65 is a portion extending from the tongue 62 to the belt winding device and is stretched from a shoulder portion of the seated occupant P1 obliquely to the lateral side of the waist portion PP via the front of a chest portion PT.

Figure 4:
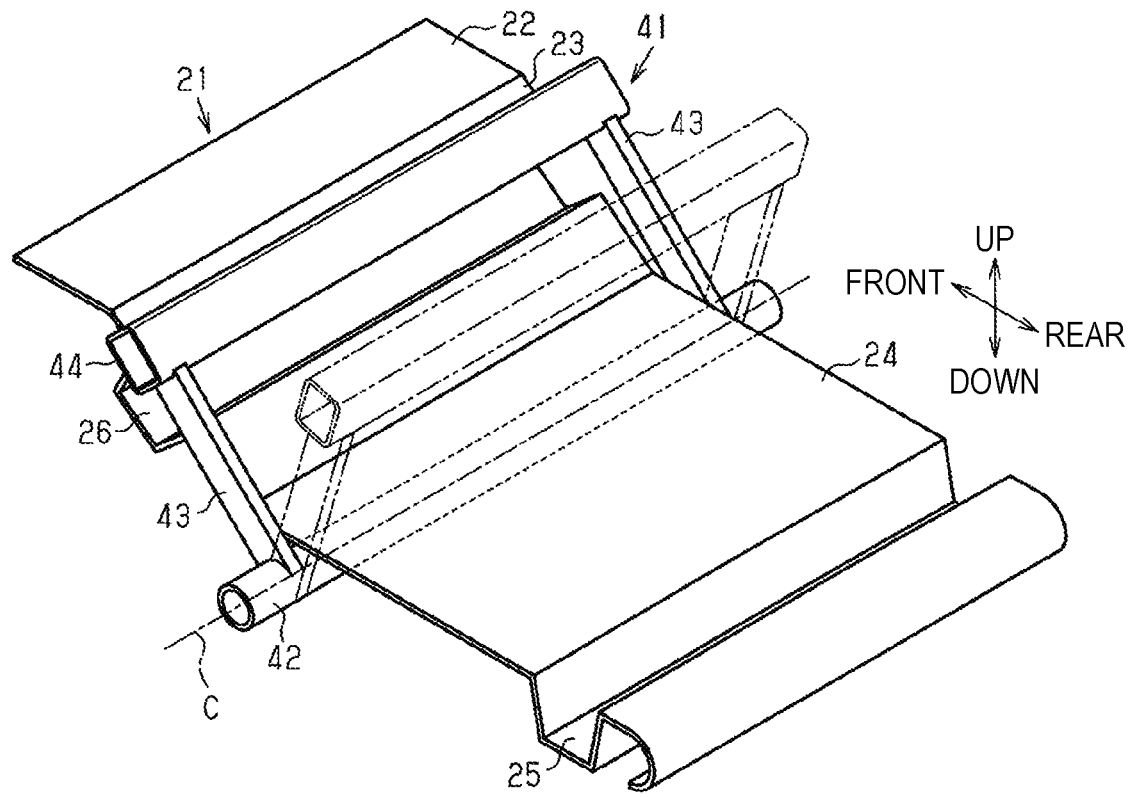
FIG. 4 is a perspective view illustrating a seat pan and a push-up member of a second push-up mechanism according to the embodiment.

As illustrated in FIGS. 3 and 4, the seat pan 21 includes a front portion 22 extending along the front-rear direction, an inclined portion 23 extending from a rear end of the front portion 22 diagonally rearward and downward, and a rear portion 24 extending rearward from the rear end of the inclined portion 23 along the front-rear direction. The seat pan 21 is fixed to a seat frame (not illustrated). In the embodiment, the length of the rear portion 24 in the front-rear direction is longer than the total length of the front portion 22 and the inclined portion 23 in the front-rear direction.

A first recess portion 25 for accommodating a part of a first push-up mechanism 30 described below in formed in the rear portion 24 of the seat pan 21. The first recess portion 25 is open upward and extends along the vehicle width direction.

In addition, a second recess portion 26 for accommodating a part of a second push-up mechanism 40 described below is formed in the inclined portion 23 of the seat pan 21. The second recess portion 26 is open obliquely rearward and upward and extends along the vehicle width direction.

The seat 10 of the embodiment is provided with an occupant protection device which protects the occupant P1 seated on the seating surface 20a of the seat 10 by suppressing the submarine phenomenon described above.

As illustrated in FIG. 3, the occupant protection device includes the first push-up mechanism 30 to push up the waist portion PP of the occupant P1 by raising the rear portion of the seating surface 20a, the second push-up mechanism 40 which pushes up a thigh portion PF of the occupant P1 by raising the front portion of the seating surface 20a, and a control device 90 for controlling the operations of the first push-up mechanism 30 and the second push-up mechanism 40.

As illustrated in FIG. 3, the first push-up mechanism 30 includes a first airbag 31 and a gas generator 32.

First, the gas generator 32 will be described.

As illustrated in FIG. 3, the gas generator 32 is for supplying an inflation gas (hereinafter referred to as gas) to the first airbag 31 and includes an inflator 33 and a retainer 34 which covers the inflator 33.

The inflator 33 of the embodiment is a pyro type. The inflator 33 has a long shape (substantially cylindrical shape) and a gas generating agent which generates gas is accommodated therein. A gas ejection portion (not illustrated) for ejecting gas is provided at one end portion in a longitudinal direction of the inflator 33 and a harness (not illustrated) serving as an input wiring for a control signal to the inflator 33 is connected to the other end portion.

Most of the retainer 34 is formed in a substantially cylindrical shape by bending a plate material such as a metal plate. Both end portions of the retainer 34 are open. A plurality of bolts 35 protrude from an outer peripheral surface of the retainer 34 at intervals in the longitudinal direction of the retainer 34.

Next, the first airbag 31 will be described.

The first airbag 31 has a function of raising the rear portion of the seating surface 20a of the seat cushion 11 by being inflated. One piece or multiple pieces of cloth (also called base cloth, panel cloth, or the like) overlapped with each other are folded in two along a fold line set at the center thereof and overlapped in a vertical direction and the overlapped portions are combined into a bag shape, in such a manner that the first airbag 31 is formed.

As the cloth piece, a woven fabric formed using a material having high strength and flexibility, for example, polyester yarn, polyamide yarn, or the like is suitable.

The first airbag 31 has a vent hole 31a.

The first airbag 31 in a deployed state is located below a buttocks PB of the occupant P1 seated on the seat cushion 11.

The gas generator 32 described above is disposed in a rear portion in the first airbag 31 in a posture extending in the vehicle width direction. The rear portion of the first airbag 31 is accommodated in the first recess portion 25 of the seat pan 21 together with the gas generator 32. The front portion of the first airbag 31 is disposed between the rear portion 24 of the seat pan 21 and the cushion portion 20 in a state where the front portion is expanded in a plane without being filled with gas.

Further, the plurality of bolts 35 in the gas generator 32 are inserted into the cloth piece and penetrated through the bolt holes at the bottom of the first recess portion 25 of the seat pan 21. A nut 36 is screwed into each bolt 35 from below, whereby the gas generator 32 is fastened to the first recess portion 25 together with the first airbag 31.

As illustrated in FIGS. 3 and 4, the second push-up mechanism 40 includes a push-up member 41 and a second airbag 46 and a gas generator 47 as drive units which displace the push-up member 41 from an accommodation position (position indicated by the solid line in FIG. 4) to a standing position (position indicated by the two-dot chain line in FIG. 4) which is the position above the accommodation position and where the front portion of the seating surface 20a is raised.

First, the push-up member 41 will be described.

The push-up member 41 is disposed below a front portion of the rear portion 24 of the seat pan 21 and has a rotating shaft portion 42 which has a cylindrical shape and extends along the width direction of the seat 10. Both end portions of the rotating shaft portion 42 are positioned on further outer side than both ends in the width direction of the rear portion 24.

A pair of arm portions 43 extending in parallel to each other perpendicular to an axial direction (the width direction of the seat 10) of the rotating shaft portion 42 are connected to both end portions of the rotating shaft portion 42. A connecting portion 44 which has a rectangular tubular shape and is located between the cushion portion 20 and the seat pan 21 to extend along the width direction of the seat 10 is connected to a tip end portion of each arm portion 43. The push-up member 41 is made of a metal material such as a steel material.

The rotating shaft portion 42 is rotatably supported by seat frames (not illustrated) arranged on both sides of the seat pan 21 in the width direction. Accordingly, each arm portion 43 and connecting portion 44 can tilt between the accommodation position and the standing position about an axis C of the rotating shaft portion 42.

First, the gas generator 47 will be described.

As illustrated in FIG. 3, the gas generator 47 is for supplying inflation gas (hereinafter referred to as gas) to the second airbag 46 and includes an inflator 48 and a retainer 49 which covers the inflator 48.

The inflator 48 is called a pyro-type similar to the inflator 33 which constitutes the first push-up mechanism 30 described above. The inflator 48 has a long shape (substantially cylindrical shape) and a gas generating agent which generates gas is accommodated therein. A gas ejection portion (not illustrated) for ejecting gas is provided at one end portion of the inflator 48 in the longitudinal direction and a harness (not illustrated) serving as an input wiring for a control signal to the inflator 48 is connected to the other end portion.

The retainer 49 has the same shape as that of the retainer 34 described above. A plurality of bolts 50 protrude from the outer peripheral surface of the retainer 49 at intervals in the longitudinal direction of the retainer 49.

Next, the second airbag 46 will be described.

The second airbag 46 is provided between the cushion portion 20 and the seat pan 21 and has a function of pressing the connecting portion 44 of the push-up member 41 toward the standing position by being inflated by the supply of gas.

The second airbag 46 is formed of the similar piece of cloth as the first airbag 31.

The second airbag 46 includes a front portion 46a located between the connecting portion 44 of the push-up member 41 in the accommodation position and the inclined portion 23 of the seat pan 21 and a rear portion 46b located behind the connecting portion 44.

The second airbag 46 is located below the thigh portion PF of the occupant P1 seated on the seat cushion 11 in a deployed state and has a front portion 46a and a rear portion 46b which pinch the connecting portion 44 in the standing position from the front and rear (see FIG. 5C). That is, a holding recess portion 46c for holding the connecting portion 44 is provided between the front portion 46a and the rear portion 46b of the second airbag 46.

The gas generator 47 described above is disposed in a posture extending in the vehicle width direction in a center portion of the second airbag 46 in the front-rear direction. The second airbag 46 is accommodated in the second recess portion 26 of the seat pan 21 together with the gas generator 47. The front portion 46a of the second airbag 46 is disposed on the inclined portion 23 of the seat pan 21 in a state where the front portion 46a is expanded in a plane without being filled with gas.

Further, the plurality of bolts 50 in the gas generator 47 are inserted into the cloth piece and penetrated through the bolt holes at the bottom of the second recess portion 26 of the seat pan 21. A nut 51 is screwed into each bolt 50 from below, whereby the gas generator 47 is fastened to the second recess portion 26 together with the second airbag 46.

The control device 90 controls the operations of the inflators 33 and 48. The control device 90 is connected to an impact sensor 91 which detects that an impact is applied to the vehicle from the front and an angle sensor 92 which detects an inclination angle α of the seat back 12 of the seat 10 with respect to the vertical direction.

When it is detected that an impact is applied to the vehicle from the front based on a signal output from the impact sensor 91, the control device 90 activates the gas generator 47 of the first push-up mechanism 30 and then activates the gas generator 47 of the second push-up mechanism 40.

Here, when a rearward inclination angle α of the seat back 12 with respect to the vertical direction is equal to or greater than a predetermined angle α1 (for example, 40 degrees), the control device 90 determines that the seating posture of the occupant P1 is a comfortable posture, so after detecting the impact, the control device 90 operates the first push-up mechanism 30. Here, the first push-up mechanism 30 is operated, for example, in the period of 0 ms to 50 ms after the impact is detected. The second push-up mechanism 40 is operated, for example, in the period of 50 ms to 150 ms after the impact is detected.

On the other hand, when the inclination angle α is smaller than the predetermined angle α1, the control device 90 determines that the seating posture of the occupant P1 is not a comfortable posture and operates only the second push-up mechanism 40. That is, the first push-up mechanism 30 is not operated. Here, the second push-up mechanism 40 is operated, for example, in a period of 0 ms to 50 ms after the impact is detected.

That is, the control device 90 operates the first push-up mechanism 30 only when the occupant P1 is in the comfortable posture, and then operates the second push-up mechanism 40.

Next, the operation of the embodiment will be described.

When it is detected that an impact is applied to the vehicle from the front, if the rearward inclination angle α of the seat back 12 with respect to the vertical direction is equal to or greater than the predetermined angle α1, first, the first push-up mechanism 30 is operated by the control device 90.

Figure 5A:
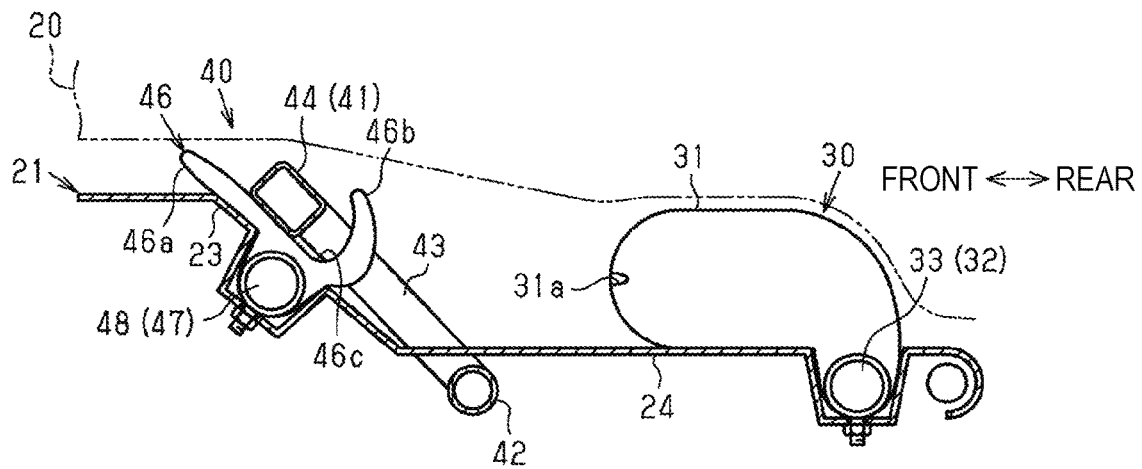
FIGS. 5A to 5C are views corresponding to FIG. 3 and are side cross-sectional views for explaining operations of the embodiment.

In this case, as illustrated in FIG. 5A, when gas is supplied to the first airbag 31 provided between the cushion portion 20 and the seat pan 21, the first airbag 31 is inflated and pushes up the cushion portion 20, thereby raising the rear portion of the seating surface 20a. As a result, the waist portion PP or the occupant P1 is pushed up. Therefore, the occupant P1 takes a comfortable posture, that is, leans back on the seat back 12, which is tilted backwards compared to a case of manual driving, the waist portion PP is pressed against the lap belt portion 64 in a state where the lap belt portion 64 of the seat belt device 60 is not properly applied to the waist portion PP.

As a result, the restraining performance of the waist portion PP by the lap belt portion 64 is enhanced. In this state, the second push-up mechanism 40 is operated by the control device 90.

Figure 5B:
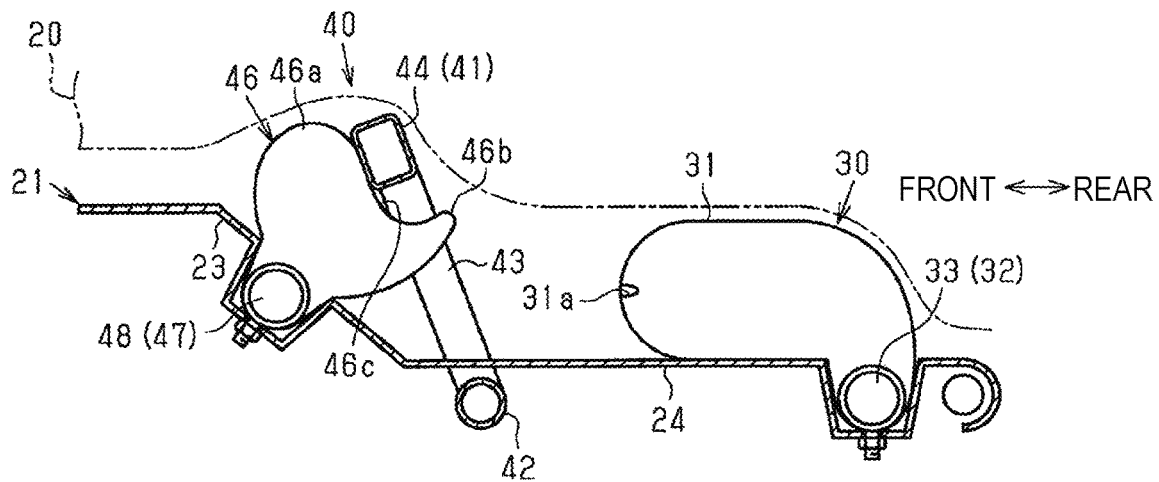
Figure 5C:
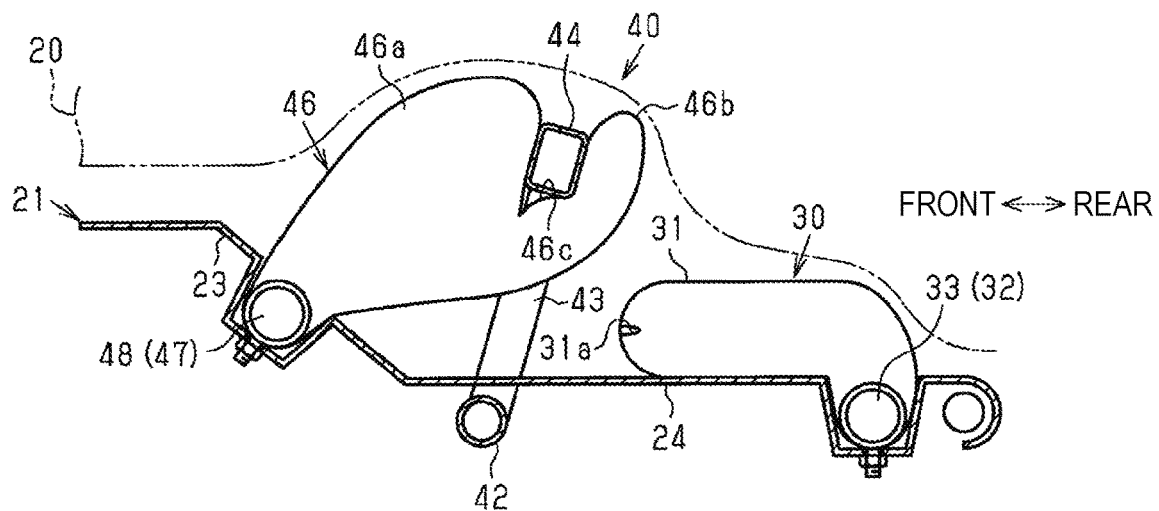

In this case, as illustrated in FIGS. 5B and 5C in order, by supplying gas to the second airbag 46 provided between the cushion portion 20 and the seat pan 21, the second airbag 46 is inflated and presses the connecting portion 44, in such a manner that the connecting portion 44 and each arm portion 43 are displaced from the accommodation position to the standing position.

The connecting portion 44 provided between the cushion portion 20 and the seat pan 21 pushes up the cushion portion 20, so that the front portion of the seating surface 20a is raised and the thigh portion PF of the occupant P1 is pushed up. This restricts the forward movement of the waist portion PP of the occupant P1.

In this case, the gas in the first airbag 31 is discharged through the vent hole 31a. As a result, the rear portion of the seating surface 20a is quickly sunk after being raised by the first bag 31.

Next, the operation effect of the embodiment will be described.

(1) The occupant protection device includes the first push-up mechanism 30 which pushes up the waist portion PP of the occupant P1 by raising the rear portion of the seating surface 20a of the cushion 11, the second push-up mechanism 40 which pushes up the thigh portion PF of the occupant P1 by raising the front portion of the seating surface 20a, and the control device 90 which controls the operation of the first push-up mechanism 30 and the second push-up mechanism 40. When it is detected that an impact is applied to the vehicle from the front of the seat 10, the control device 90 operates the first push-up mechanism 30, and then operates the second push-up mechanism 40.

According to the configuration, since the effect described above is obtained, the forward movement of the waist part PP of the occupant P1 who is in the comfortable posture can be restrained.

(2) The first push-up mechanism 30 includes the first airbag 31 which is provided between the cushion portion 20 and the seat pan 21, is inflated by the supply of gas, and pushes up the cushion portion 20 to raise the rear portion of the seating surface 20a.

According to the configuration, by supplying gas to the first airbag 31 provided between the cushion portion 20 and the seat pan 21, the first airbag 31 is inflated and pushes up the cushion portion 20 to raise the rear portion of the seating surface 20a. Accordingly, the waist portion PP of the occupant P1 can be pushed up quickly.

(3) The first airbag 31 has the vent hole 31a.

When the rising state of the rear portion of the seating surface 20a is maintained by the first airbag 31, the effect of pushing up the thigh portion PF of the occupant P1 by raising the front portion of the seating surface 20a by the second push-up mechanism 40 is reduced. As a result, the forward movement of the waist portion PP of the occupant P1 may not be effectively restrained.

In this regard, according to the configuration described above, since the gas in the first airbag 31 is discharged through the vent hole 31a, the rear portion of the seating surface 20a is quickly sunk after being raised by the first airbag 31. As a result, the effect of pushing up the thigh portion PF of the occupant P1 by raising the front portion of the seating surface 20a by the second push-up mechanism 40 is easily exhibited, and consequently, the forward movement of the waist portion PP of the occupant P1 can be effectively restrained.

(4) The second push-up mechanism 40 includes the push-up member 41 provided so as to be displaceable between the accommodation position and the standing position that is a position located above the accommodation position and raises the front portion of the seating surface 20a and a drive unit (the second airbag 46 and the gas generator 47) which displaces the push-up member 41 from the accommodation position to the standing position. The push-up member 41 includes the pair of arm portions 43 provided so as to be tiltable about the rotating shaft portion 42 having the axis C extending along the width direction of the seat 10 and the long connecting portion 44 which is provided between the cushion portion 20 and the seat pan 21, extends along the width direction of the seat 10, and is connected to the tip end portion of each arm portion 43. The control device 90 controls the operation of the gas generator 47.

According to the configuration, the push-up member 41 is displaced from the accommodation position to the standing position by the drive unit being operated by the control device 90. In this case, the connecting portion 44 provided between the cushion portion 20 and the seat pan 21 pushes up the cushion portion 20 to raise the front portion of the seating surface 20a. Here, since the connecting portion 44 has a long shape extending along the width direction of the seat 10, a pushing-up force can be effectively applied to the thigh portion PF of the occupant P1.

(5) The drive unit includes the second airbag 46 which is provided between the cushion portion 20 and the seat pan 21 and presses the connecting portion 44 toward the standing position by being inflated by the supply of gas. The second airbag 46 has the front portion 46a and the rear portion 46b which pinch the connecting portion 44 from the front and rear in the deployed state.

According to the configuration, by supplying gas to the second airbag 46 provided between the cushion portion 20 and the seat pan 21, the second airbag 46 is inflated and presses the connecting portion 44, so that the connecting portion 44 and each arm portion 43 are displaced from the accommodation position to the standing position.

Here, since the connecting portion 44 is pinched from the front and rear by the front portion 46a and the rear portion 46b of the second airbag 46 in the deployed state, it is possible to restrict the strong impact force from acting on the thigh portion PF and the waist portion PP of the occupant P1.

(6) The control device 90 operates the first push-up mechanism 30 only when the occupant P1 is in a comfortable posture, and then operates the second push-up mechanism 40.

According to the configuration, the first push-up mechanism 30 and the second push-up mechanism 40 are operated in order only when the occupant P1 is in the comfortable posture. Therefore, when the occupant P1 is not in the comfortable posture, it is possible to avoid the occurrence of inconvenience caused by the first push-up of the waist portion PP of the occupant P1.

(7) The control device 90 operates the first push-up mechanism 30 and then operates the second push-up mechanism 40 based on an assumption that the seating posture of the occupant P1 is the comfortable posture when the inclination angle c of the seat back 12 with respect to the vertical direction is equal to or greater than the predetermined angle α1.

According to the configuration, the seating posture of the occupant P1 can be easily grasped based on the rearward inclination angle c of the seat back 12 with respect to the vertical direction.

The embodiment described above can also be modified as follows, for example. The embodiment described above and the following modification examples can be implemented in combination with each other within a technically consistent range.

The inflators 33 and 48 are not limited to the pyro type. In addition, for example, the inflators may be a stored gas type which breaks a bulkhead of a high-pressure gas cylinder filled with high-pressure gas with an explosive or the like and ejects an expansion gas or a hybrid type that combines both a pyro type and a stored gas type.

The second airbag 46 may have at least the front portion 46a and have a configuration without the rear portion 46b, that is, a shape which does not pinch the connecting portion 44 of the push-up member 41.

Figure 6:
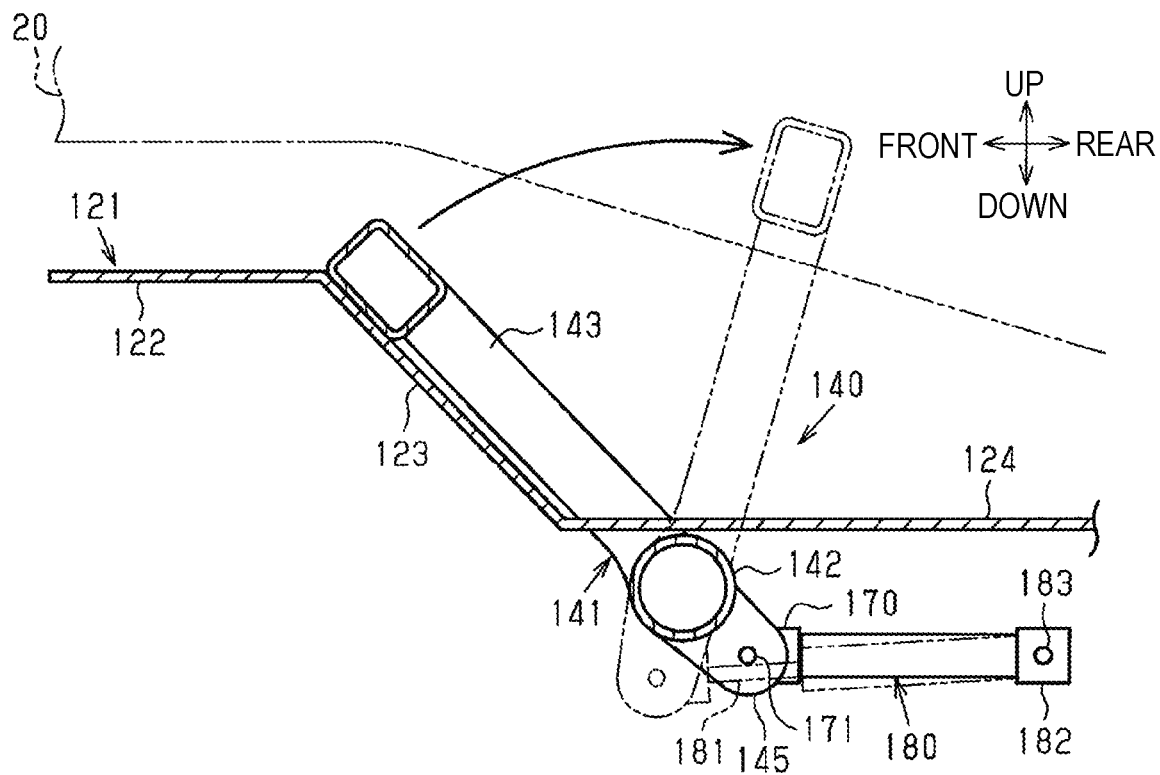
FIG. 6 is a side cross-sectional view illustrating a modification example of the second push-up mechanism.

The drive unit of the second push-up mechanism 40 is not limited to the one provided with the second airbag 46 and the gas generator 47. For example, as illustrated in FIG. 6, a second push-up mechanism 140 may include a push-up member 141 and a direct-acting-type actuator 180 which pushes and tilts the push-up member 141. In the modification example illustrated in the drawing, for the configuration corresponding to that of the embodiment described above, reference numerals "1" obtained by adding "100" to reference numerals "" of the above embodiment are added and the redundant description thereof will be omitted.

One end portion of a rotating shaft portion 142 is connected to a protruding portion 145 which protrudes in a direction opposite to a protruding direction of an arm portion 143. A pressure receiving portion 170 is pivotably connected to the protruding portion 145 via a support pin 171. The support pin 171 extends along the axial direction of the rotating shaft portion 142.

A direct-acting-type actuator 180 is disposed behind the pressure receiving portion 170. The actuator 180 is a pyro-type actuator and has a rod 181 which abuts on the pressure receiving portion 170 and can protrude forward. The rear end portion of the actuator 180 is attached to a mounting portion 182 fixed to a seat frame (not illustrated) via a support shaft portion 183 so as to be tiltable. The support shaft portion 183 extends along the axial direction of the rotating shaft portion 142.

According to the second push-up mechanism 140 with this configuration, when the pressure receiving portion 170 is pressed forward by the rod 181 of the direct-acting-type actuator 180, the protruding portion 145 connected to the pressure receiving portion 170 is displaced forward, and thus the rotating shaft portion 142 is rotated in a clockwise direction in the drawing. Therefore, the push-up member 141 can be displaced from the accommodation position to the standing position. Thus, the push-up member 141 is directly driven by the direct-acting-type actuator 180, so that the operating speed of the second push-up mechanism 140 can be increased.

Figure 7:
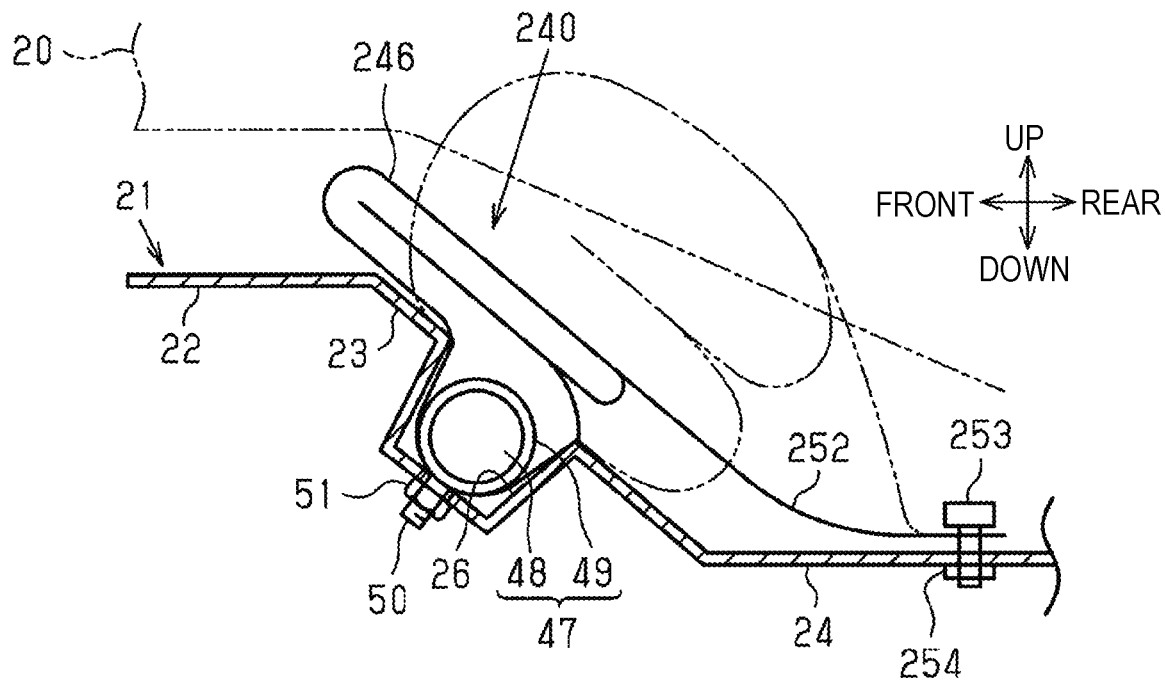
FIG. 7 is a side cross-sectional view illustrating another modification example of the second push-up mechanism.

The second push-up mechanism is not limited to the one having the push-up members 41 and 141. For example, as illustrated in FIG. 7, a second push-up mechanism 240 may not include a push-up member and may raise the front portion of the seating surface 20a by pushing up the cushion portion 20 with an inflated second airbag 246. Hereinafter, the description will focus on the differences from the second airbag 46 of the embodiment described above. In the modification example illustrated in the drawing, the same components as those in the embodiment described above are denoted by the same reference numerals and redundant description is omitted.

The second airbag 246 is disposed in a state in which a part of the second airbag 246, which is the part located further on a front side than a center position in the front-rear direction, is overlaid on a rear part thereof.

A belt-shaped tether 252 extending rearward is coupled to an upper fabric piece of the second airbag 246. A plurality (for example, two) of the tethers 252 are preferably provided at intervals in the width direction of the seat 10. The rear end portion of the tether 252 is fastened to the rear portion 24 of the seat pan 21 via a bolt 253 and a nut 254.

According to the configuration, by supplying the gas from the gas generator 47 to the second airbag 246 provided between the cushion portion 20 and the seat pan 21, the second airbag 246 is inflated and pushes up the cushion portion 20 to raise the front portion of the seating surface 20a. In this case, the second airbag 246 is superposed vertically as described above and the upper portion of the second airbag 246 is restricted by the tether 252 from being deployed forward. Therefore, the vertical thickness of the second airbag 246 is easily secured. Therefore, the thigh portion PF of the occupant P1 can be pushed up quickly and surely.

The vent hole 31a of the first airbag 31 can be omitted.

The first push-up mechanism 30 may push up the waist portion PP of the occupant P1 by raising the rear portion of the seating surface 20a and can adopt a configuration other than an airbag.

When a seat is the seat where the occupant P1 is always in a comfortable posture, if it is detected that an impact is applied to the vehicle from the front, the control device 90 may perform the operations of the first push-up mechanism 30 and the second push-up mechanism 40 in order without performing the determination process using the detection result of the angle sensor 92.

The control device 90 may operate the first push-up mechanism 30 and the second push-up mechanism 40 in order when an impact applied to the vehicle from the front of the seat 10 is predicted by a radar device, a camera device, or the like.

What is claimed is:

1. An occupant protection device for a vehicle which protects an occupant seated on a seating surface of a seat, the occupant protection device comprising:
a first push-up mechanism which pushes up a waist portion of the occupant by raising a rear portion of the seating surface;
a second push-up mechanism which pushes up a thigh portion of the occupant by raising a front portion of the seating surface; and
a control unit which controls operations of the first push-up mechanism and the second push-up mechanism, wherein
the control unit operates the first push-up mechanism and then operates the second push-up mechanism when an impact applied to the vehicle from the front of the seat is detected or predicted, wherein:

a seat cushion of the seat includes a cushion portion having the seating surface and a support member which supports the cushion portion from below;

the second push-up mechanism includes:
- an arm portion provided to be tiltable about an axis extending along a width direction of the seat;
- a connecting portion which is provided between the cushion portion and the support member, extends along the width direction of the seat, and is connected to a tip end portion of the arm portion;
- a push-up member provided so as to be displaceable between an accommodation position and a standing position which is above the accommodation position and at which the front portion of the seating surface is raised; and
- a drive unit for displacing the push-up member from the accommodation position to the standing position; and the control unit controls an operation of the drive unit.

2. The occupant protection device for a vehicle according to claim 1, wherein:
the first push-up mechanism includes an airbag which is provided between the cushion portion and the support member, inflated by the supply of gas, and pushes up the cushion portion to raise a rear portion of the seating surface.

3. The occupant protection device for a vehicle according to claim 2, wherein
the airbag has a vent hole.

4. The occupant protection device for a vehicle according to claim 1, wherein:
the drive unit includes an airbag which is provided between the cushion portion and the support member and presses the connecting portion toward the standing position by being inflated by the supply of gas; and
the airbag pinches the connecting portion from the front and rear in a deployed state.

5. The occupant protection device for a vehicle according to claim 1, wherein
the drive unit is a direct-acting-type actuator which presses and tilts the push-up member.

6. The occupant protection device for a vehicle according to claim 1, wherein:
the second push-up mechanism includes an airbag which is provided between the cushion portion and the support member, inflated by the supply of gas, and pushes up the cushion portion to raise a front portion of the seating surface.

7. The occupant protection device for a vehicle according to claim 1, wherein
the control unit operates the first push-up mechanism only when the occupant is in a comfortable posture, and then operates the second push-up mechanism.

8. The occupant protection device for a vehicle according to claim 7, the occupant protection device further comprising:
a detector which detects an inclination angle of a seat back of the seat with respect to a vertical direction of the vehicle, wherein
the control unit operates the first push-up mechanism, and then operates the second push-up mechanism based on an assumption that a seating posture of the occupant is a comfortable posture when the rearward inclination angle of the seat back with respect to the vertical direction is equal to or greater than a predetermined angle.

* * * * *